March 31, 1936. E. M. LIVINGSTON 2,035,661
CONNECTER FOR ELECTRIC CABLES
Filed Nov. 10, 1932
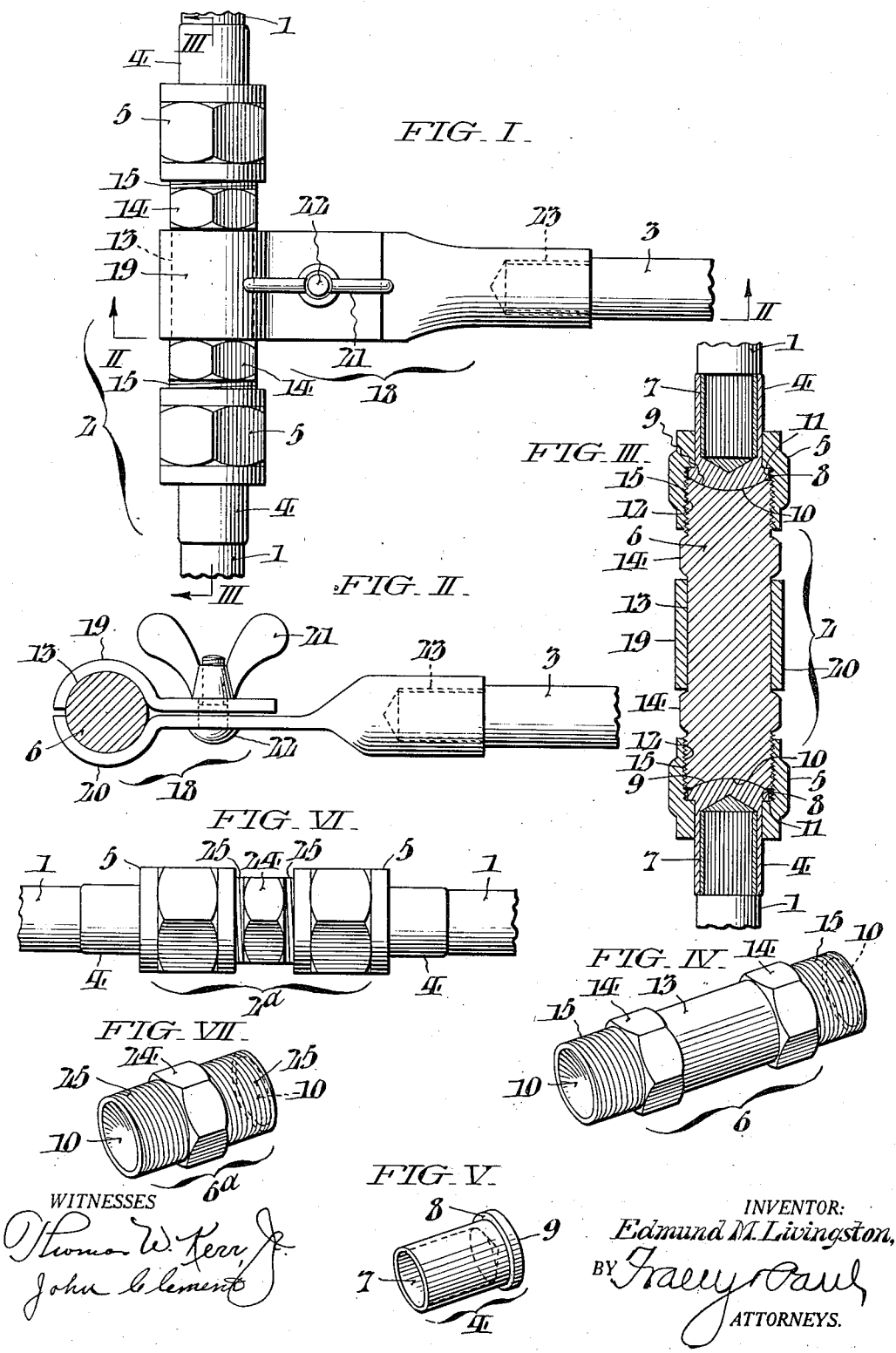
INVENTOR:
Edmund M. Livingston,
BY
ATTORNEYS.

Patented Mar. 31, 1936

2,035,661

UNITED STATES PATENT OFFICE 2,035,661

CONNECTER FOR ELECTRIC CABLES

Edmund M. Livingston, Chambersburg, Pa.

Application November 10, 1932, Serial No. 641,985

1 Claim. (Cl. 173—263)

My invention relates generally to connecters for joining together electric cable sections, and more particularly to connecters which join one conductor to another, and which are so designed as to be capable of being assembled and disassembled with ease and rapidity.

While the invention is adapted for a variety of uses, I have found it to be especially useful as applied to electric welding. For example, in welding rails along a section of railway track it is desirable to employ comparatively long cables. However, it is a difficult matter to drag the cables along the ground following the welding operations as they continue from one point to another. The cables are heavy, and dragging them along the ground wears them out very quickly. By dividing the cables into comparatively short lengths and joining the sections together by the connecters of this invention, these difficulties are avoided.

The object of the invention is to provide a cable connecter which is suited for such use as that described, as well as many other uses, and which is characterized by such features as interchangeability, the parts of the cable connecter being duplicated at each end, and ease of assembly and disassembly.

Other objects and advantages characterizing my invention, including the maintenance of good electrical contact between the cable sections which are joined together, will become more fully apparent from the description hereinafter set forth of certain embodiments or examples of the practice of the invention. The description has reference to the accompanying drawing, whereof:

Fig. I represents a plan view of a cable connecter of my invention and a ground connection associated therewith.

Fig. II represents a cross section of the same, taken as indicated by the lines II—II of Fig. I.

Fig. III represents a longitudinal cross section of the same, taken as indicated by the lines III—III of Fig. I.

Fig. IV represents a perspective view of a connecting member constituting a part of the connecter.

Fig. V represents a perspective view of a terminal member constituting a part of the connecter.

Fig. VI represents a plan view of a modified form of connecter; and,

Fig. VII represents a perspective view of the member shown in Fig. V.

In the drawing, with particular reference to Figs. I, II, and III, I have shown an example of the use of my invention as applied to electric cables such as are used for the welding of railway rails. Two adjoining cable sections 1 are shown joined together by one form of connecter of my invention, comprehensively designated at 2. The cable section 1 may be assumed to constitute a return lead to an electric generator and to be grounded to a rail by means of a grounding cable 3. Obviously, however, this represents but one example of a convenient use to which the connecters of my invention are adapted.

The connecter comprehensively designated at 2 comprises generally terminal members 4 secured to the ends of the sections of the cable 1, nut-shaped coupling members 5 in the form of sleeves swivelling on the terminal members 4, and a connecting member 6 joining together the nut-shaped coupling members 5.

Each terminal member 4, as shown clearly in Fig. V, is counterbored at 7 to form a socket which is adapted to accommodate with a snug fit the end of a cable section 1. Preferably I secure the cable section to the terminal member 4 by inserting the cable into the counterbored portion 7, and then pouring hot solder around the cable. At its opposite end each terminal member 4 is enlarged to form a head 8 and to present a relatively broad smooth contact face 9 to the end of the connecting member 6. Preferably, the end face 9 is convex in form and abuts against a complementary concave face 10 at the end of the connecting member 6.

The form of each coupling member 5, in the selected example of my invention, is clearly shown in Fig. III. Interiorly each coupling member 5 is formed with a shoulder 11 which engages against the head 8 of the terminal member 4. Thus the coupling member 5 serves as a sleeve closely fitting and swivelling on its terminal member, and longitudinal separation of these parts is prevented. Exteriorly each coupling member 5 is formed with a nut-shaped contour whereby the coupling member may be conveniently turned by means of a wrench. Beyond the shoulder 11 the coupling member 5 is provided with an interiorly threaded socket portion 12.

The connecting member 6 may take a number of forms, essentially rod-like, two of which are illustrated in the drawing. According to the form shown in Figs. I and III, the connecting member 6 comprises a central body portion of smooth cylindrical exterior contour as indicated at 13, and at each side of this portion, regions of nut-shaped contour, as indicated at 14. Beyond the nut-shaped portions 14, the connecting member has threaded plug ends 15 which are adapted to engage within the correspondingly threaded socket portions 12 of the coupling members 5. The two ends 15 of the connecting member 6 are like-threaded and the coupling members 5 are also like-threaded. Accordingly, the connecter is interchangeable, and it matters not which end of one cable section is presented for coupling with the end of another cable section, for the parts of the connecter are duplicated at each end.

The form of connecting member 6 shown in Figs. I and III is especially applicable to a cable which is adapted to be grounded at intervals of its length. When a ground connection is applied, it may take the form illustrated in Figs. I and II. The connection there shown has at one end a clamp 18 including upper and lower members 19 and 20 of semi-cylindrical shape which are adapted to surround and engage the cylindrical body portion 13 of the connecting member 6. A wing nut 21 and bolt 22 are conveniently employed for bringing together the upper and lower parts 19 and 20 of the clamp 18. The clamp 18 also includes a socket 23 which accommodates one end of the grounding cable 3, the cable being preferably soldered to the socket 23 in the same manner as the cables 1 are soldered to the terminal members 4. Obviously, the particular form of clamp which is here shown for joining the grounding cable 3 to the connecter 2 represents only one form of device contemplated for this purpose.

In Fig. VI I have shown a modified form of connecter, comprehensively designated at 2a, in which the terminal members 4 and coupling members 5 are of the same form as that previously described in connection with the remaining figures. This form of connecter may be used where the cable sections are not adapted for grounding. Accordingly, the connecting member 6a has been simplified and it comprises, as illustrated clearly in Fig. VII, simply a nut-shaped body portion 24 and threaded plug ends 25. In other respects this form of connecter is similar to the one previously described.

By forming the end faces 9 and 10 of the terminal members and the connecting member, respectively, with relative broad spherically concave and convex surfaces (the extent of these surfaces being large as compared with the diameter of the cable sections) there is insured good electrical contact when the parts of the connecter are assembled in abutting relation. Moreover, it will be apparent that the connecter of my invention, as described above, may be assembled and disassembled with ease and rapidity, and that these operations do not involve any twisting of the cable sections because of the swivel coupling employed. The interchangeability of the ends of the connecter and the manner in which the coupling is effected make it particularly useful as a temporary connection between adjoining cable sections.

While I have described two particular forms which the connecter of my invention may take, it will be apparent that various changes may be made in the form of the apparatus herein described and illustrated without departing from the spirit of my invention as defined in the annexed claim.

Having thus described my invention, I claim:

An electrical cable connecter comprising terminal members having cylindrical socket portions accommodating the ends of adjoining cable sections and having enlarged heads beyond the ends of the cable sections, coupling members in the form of sleeves closely fitting and adapted to swivel about said terminal members and having internally threaded socket portions, a rod-like connecting member disposed between said cable sections having like-threaded plug ends engaging the socket portions of said coupling members, and having end faces in surface contact with and corresponding in diameter to the end faces of the heads of the terminal members, said abutting faces being in the one case substantially spherically concave and in the other case substantially spherically convex, and said terminal members, coupling members, and connecting member, when assembled, forming a solid mass of conducting material between the ends of the cable sections, whereby in the event of disalignment between the connecting member and a terminal member said surface contact will be preserved.

EDMUND M. LIVINGSTON.